Sept. 16, 1958
S. LANDON
2,852,141
FILTER APPARATUS
Filed Oct. 27, 1955
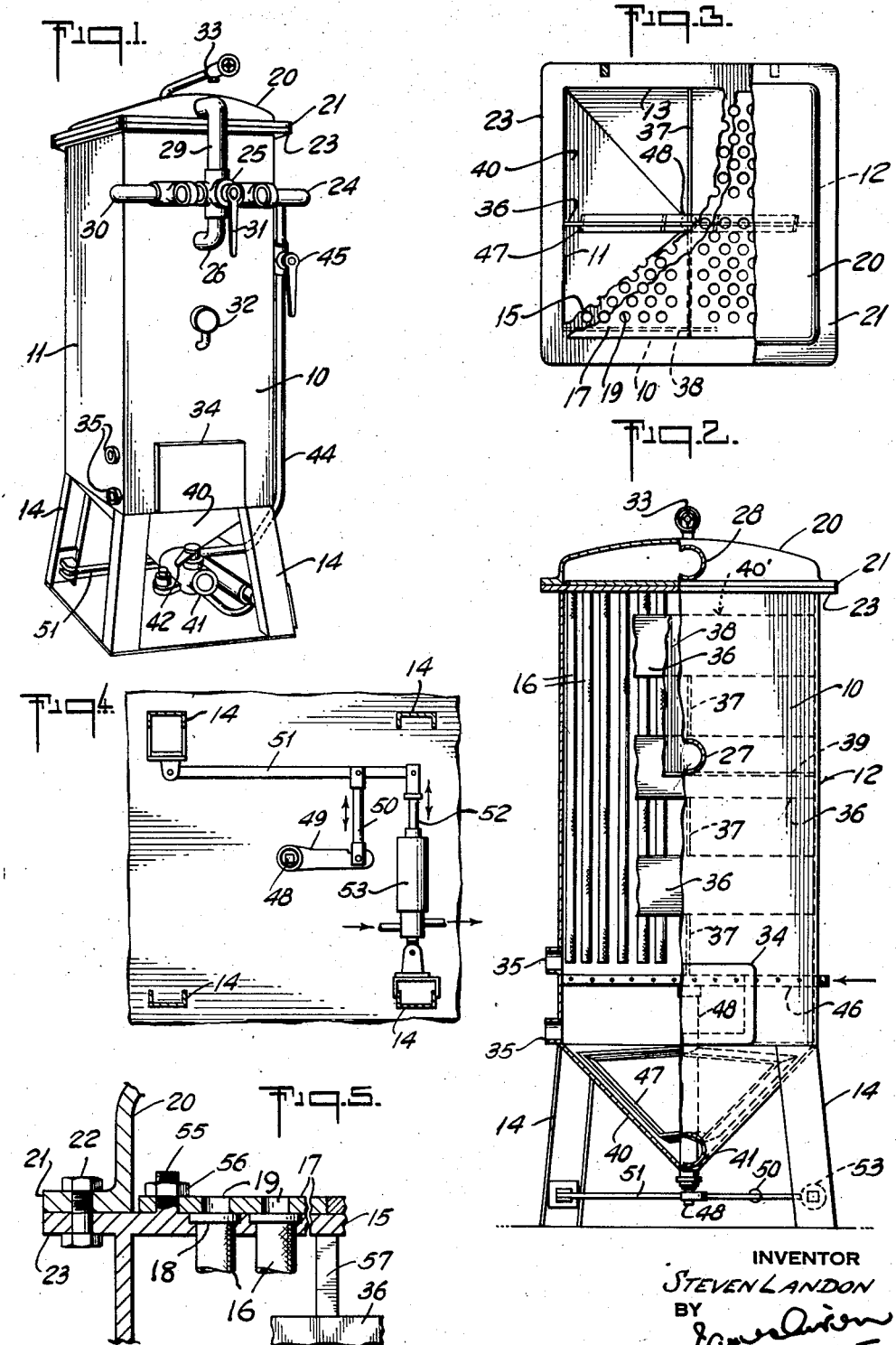
INVENTOR
STEVEN LANDON
BY
ATTORNEY United States Patent Office 2,852,141
Patented Sept. 16, 1958

2,852,141

FILTER APPARATUS

Steven Landon, Bayside, N. Y., assignor to Washex Machinery Corporation, Brooklyn, N. Y., a corporation of New York Application October 27, 1955, Serial No. 543,207

4 Claims. (Cl. 210—407)

This invention relates to a filter apparatus having a casing provided with a horizontal partition plate from which removable filter tubes are suspended into the portion of the casing to which the liquid to be filtered is delivered under pressure and the filtered liquid passes from the interior of the filter tubes to the upper side of said partition plate.

In such filter apparatus as heretofore constructed, the casing is in the form of an upright cylinder having a bottom part in the form of an inverted cone with means for scraping the internal conical surface for the removal of dirt and sludge therefrom, and backwash means have also been provided for reversing the liquid flow to remove the dirt and filter cake from the surfaces of the filter tubes.

One object of the present invention is to effect a substantial saving in floor space by constructing the casing with a horizontal cross-section of rectangular form.

Another object of the invention is to provide, in the high pressure chamber of the container below the horizontal partition plate, a plurality of plates or strips extending horizontally between the internal surfaces of opposed flat walls of the container and serving as ties to prevent outward bulging of the flat walls under internal pressure.

Still another object is to provide a vertical partition wall extending between opposed walls of the casing and serving to direct the incoming liquid to the upper part of the casing.

Still another object is to arrange the said tie plates or strips in groups or series with their upper and lower edges engaging or adjacent to corresponding edges disposed at right angles thereto in such manner that the tie plates do not restrict the capacity of the high pressure chamber for the accommodation of the filter tubes.

Still another object is to construct the bottom of the casing in the form of an inverted pyramid with four substantially flat triangular internal surfaces, and still another object is to provide within the bottom structure a rotary sludge agitator mounted on a vertical axis and having fluid pressure means for the operation thereof to agitate the sludge and dirt in the lower part of the container without scraping the internal surface thereof and thus causing unnecessary wear and resistance.

Other objects and advantages of the invention will appear more fully from the following description, especially when taken in conjunction with the accompanying drawing which forms a part thereof.

In the drawing:

Fig. 1 is a perspective view of the filter apparatus.

Fig. 2 is a front view partly broken away to show the internal construction.

Fig. 3 is a plan view broken away at different levels to show the internal construction and arrangement of internal parts.

Fig. 4 is a detail plan view showing the supporting numbers and the actuating means for the agitator, and Fig. 5 is a detail sectional view.

Referring to the drawings, an upright rectangular casing has a square horizontal cross-section and is formed with a front plate 10, side plates 11, 12 and a back plate 13, all supported on legs 14 of channel construction. The casing is formed with an upper horizontal partition wall 15 perforated for the reception of a large number of filter tubes 16. Hold-down plates 17 are provided (see Fig. 5) for holding the tubes 16 in their assembled position, and these plates 17 engage flanges 18 on the upper ends of the tubes and are provided with perforations 19 in alignment with the center lines of the tubes for the passage of the filtered liquid to the upper space. The plates 17 may be held in place upon the partition 15 by suitable studs 55 and nuts 56, and the space above the filter tubes is enclosed by a dome or cover 20 having a lower flange 21 through which it may be secured by bolts 22, or the like, to a flange 23 on the container.

The liquid to be filtered is delivered to the casing through an inlet pipe 24 through a two-way valve 25 and through a pipe connection 26 to the inlet opening 27 in the front wall 10 of the casing, and after passing through the filter tubes 16 the liquid passes through an outlet opening 28 in the dome 20 and through a pipe connection 29 to the said valve 25 and from thence to an outlet pipe 30. The two-way valve 25 is provided with a throw-over handle 31 so that when so desired the liquid supplied through the pipe 24 may be directed through the pipe 29 to the dome 20 while the connection 26 is put into communication with the outlet pipe line 30 so that the flow through the filter tubes may be reversed to provide a backwash. During normal operation the liquid below the partition wall 15 is under pressure and 32 is a pressure gauge for the pressure chamber and 33 is a vent valve for the escape of imprisoned air from the dome 20.

The lower part of the front 10 of the casing is provided with a hinged or removable inspection door 34 and in the lower part of the side 11 openings 35 are provided for draining or cleaning the casing.

The walls 10—13 of the casing may be of thin sheet metal and in order to withstand the internal pressure of the liquid on the flat wall surfaces the side walls 11, 12 are connected by means of three centrally disposed tie plates 36 spaced from each other and connected at their ends to said walls by welding or in other convenient manner and the front and rear walls 10, 13 are similarly connected by tie plates 37 interposed between the plates 36 and as the tie plates 36, 37 are not of substantial thickness they extend between the depending filter tubes 16 without restricting the space available for such tubes. To prevent upward buckling of the partition 15 the underside thereof is connected by tie members 57 with the uppermost of the tie plates 36. In order to prevent the entering liquid from impinging upon the adjacent filter surfaces in the vicinity of the inlet 27 a partition plate 38 is vertically disposed in close proximity to the inner surface of the front wall 10 with the side edges of the plate 38 welded to or engaging the side walls 11, 12 while a flange 39 on the lower edge of the plate 38 engages or is welded to the front wall 10 just below the inlet 27. The upper edge 40' is arranged in spaced relation to the horizontal partition 15 so that the liquid entering the casing through the opening 27 is directed upwardly and over the upper edge 40' of the plate 38 before reaching any of the filter tubes 16. The partition plate 38 is slotted for the passage of the uppermost of the three tie plates 37 arranged at right angles to said partition.

The bottom of the casing is in the form of an inverted pyramid, being formed with four flat substantially rectangular portions 40 and the lower part thereof is connected with an outlet opening 41 having a valve 42 for the discharge of dirt and sludge from the bottom of the casing. The lower part of the said bottom structure communicates with an inlet pipe 44 having a control valve 45 and connected to the inlet pipe 24 so that when so desired liquid under pressure may be supplied to the lower part of the bottom structure to agitate or circulate the sludge or filter aid material that may have settled in the bottom of the container and a perforated air pipe 46 extends from side to side of the container near the bottom thereof and extends outwardly through the side wall 12 for the attachment of an air pressure supply pipe for the supply of air pressure as and when desired to cause any desired agitation in the liquid being filtered.

For the agitation of the heavier sludge and dirt collecting in the bottom structure, a rotary or rocking frame with vanes or blades 47 is mounted on a vertical spindle 48 which extends downwardly through the lower extremity of the structure and, at its lower end, the spindle 48 is provided with an arm, or preferably a ratchet arm, 49 which is connected by a link 50 with a lever 51 one end of which is anchored to one of the legs 14 while the opposite end is jointed to a piston rod 52 cooperating with a cylinder 53 to which compressed air may be supplied when it is desired to actuate the rotary or rocking vanes or blades 47 to agitate the sludge in the lower part of the container and the vanes or blades 47 are mounted in spaced relation to the inner flat surfaces of the parts 40 with sufficient clearance to avoid any scraping action so that friction losses are avoided and a minimum of fluid pressure is required to actuate the vanes 47 and to effectively agitate the heavy sludge.

While a suitable embodiment of the invention has been described herein, it is to be understood that this disclosure is not intended as any limitation except within the scope of the claims hereunto or hereinafter appended.

I claim:

1. A filter apparatus of the type having filter tubes suspended from an upper partition plate and comprising four upright flat walls forming the casing of the apparatus, two groups of tie plates arranged within the casing at right angles to each other and interposed between the filter tubes and connected to the walls of the casing to resist bulging of the said walls under internal fluid pressure, said plates having a combined depth substantially equal to the height of the upright walls of the casing, the tie plates of each group being spaced from each other in a vertical direction to form spaces for the accommodation of the spaced tie plates of the other group to provide free access of the unfiltered liquid to all said filter tubes, and at least one tie member secured to the underside of the said upper partition plate and to the upper edge of the uppermost tie plate to prevent upward bulging of said partition plate under internal fluid pressure.

2. A filter apparatus, according to claim 1, comprising blades mounted for movement about a vertical axis to agitate the contents of the lower part of the casing, and means actuated by fluid pressure for operating said blades to cause such agitation.

3. A filter apparatus of the type having filter tubes suspended from an upper partition plate, and comprising four upright flat walls forming the casing, two groups of tie plates arranged within the casing at right angles to each other and interposed between the filter tubes and connected to the walls of the casing to resist bulging of the said walls under internal fluid pressure, said plates having a combined depth substantially equal to the height of the upright walls of the casing, the tie plates of each group being spaced from each other in a vertical direction to form spaces for the accommodation of the spaced tie plates of the other group to provide free access of the unfiltered liquid to all said filter tubes, and a vertical internal partition wall extending between opposed vertical walls of the casing to direct towards said upper partition plate fluid admitted to said casing.

4. A filter apparatus of the type having filter tubes suspended from an upper partition plate, and comprising four upright flat walls forming the casing, two groups of ties plates arranged within the casing at right angles to each other and interposed between the filter tubes and connected to the walls of the casing to resist bulging of the said walls under internal fluid pressure, said plates having a combined depth substantially equal to the height of the upright walls of the casing, the tie plates of each group being spaced from each other in a vertical direction to form spaces for the accommodation of the spaced tie plates of the other group to provide free access of the unfiltered liquid to all said filter tubes, a vertical partition plate arranged in close proximity to one of the walls of said casing and connected to two of the other walls of the casing, and a vertical slot in said vertical partition for the accommodation of the uppermost of the tie plates secured to the casing walls parallel to said vertical partition plate.

References Cited in the file of this patent

UNITED STATES PATENTS

| 1,443,500 | Phillips | Jan. 30, 1923 |
| 1,895,747 | Beldimano | Jan. 31, 1933 |
| 1,912,505 | Weston | June 6, 1933 |
| 2,027,681 | Durant et al. | Jan. 14, 1936 |
| 2,108,021 | Russell | Feb. 8, 1938 |
| 2,572,971 | Bauer | Oct. 30, 1951 |
| 2,693,882 | Olson et al. | Nov. 9, 1954 |
| 2,784,846 | Olson et al. | Mar. 12, 1957 |

FOREIGN PATENTS

| 49,270 | Switzerland | Sept. 13, 1909 |